US008509288B2

(12) United States Patent
Erkip et al.

(10) Patent No.: US 8,509,288 B2
(45) Date of Patent: Aug. 13, 2013

(54) SPATIAL MULTIPLEXING GAIN FOR A DISTRIBUTED COOPERATIVE COMMUNICATIONS SYSTEM USING RANDOMIZED CODING

(75) Inventors: Elza Erkip, New York, NY (US);
Thanasis Korakis, Brooklyn, NY (US);
Pei Liu, Forest Hills, NY (US);
Shivendra S. Panwar, Freehold, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 997 days.

(21) Appl. No.: 12/478,687

(22) Filed: Jun. 4, 2009

(65) Prior Publication Data

US 2009/0316763 A1    Dec. 24, 2009

Related U.S. Application Data

(60) Provisional application No. 61/058,721, filed on Jun. 4, 2008.

(51) Int. Cl.
*H04B 3/36*      (2006.01)

(52) U.S. Cl.
USPC .......... 375/211; 178/70 R; 370/226; 370/315; 375/267

(58) Field of Classification Search
None
See application file for complete search history.

(56) References Cited

U.S. PATENT DOCUMENTS

| 7,330,457 | B2 | 2/2008 | Panwar et al. | |
|---|---|---|---|---|
| 7,720,020 | B2* | 5/2010 | Larsson | 370/315 |
| 2008/0101437 | A1* | 5/2008 | Janani et al. | 375/131 |

OTHER PUBLICATIONS

Foschini, G. J., "Layered Space-Time Architecture for Wireless Communication in a Fading Environment When Using Multi-Element Antennas," *At &T Bell Lab. Technical Journal* pp. 41-59 (Oct. 1996).
Laneman, N. J. and Wornell, Gregory W. W., "Distributed Space-Time-Coded Protocols for Exploiting Cooperative Diversity in Wireless Networks," *IEEE Transactions on Information Theory* vol. 49, No. 10, pp. 77-81 (Oct. 2003).
Zheng, L. and Tse, David. N. C., "Diversity and Multiplexing: A Fundamental Tradeoff in Multiple-Antenna Channels," *IEEE Transactions on Information Theory* vol. 49, No. 5, pp. 1073-1096 (Oct. 2003).
Sendonaris, A., Erkip, E., and Aazhang, B., "User Cooperation Diversity-Part 1: System Description," *IEEE Transactions on Communications* vol. 51, No. 11, pp. 1927-1938 (Nov. 2003).
Sendonaris, A., Erkip, E., and Aazhang, B., "User Cooperation Diversity-Part II: Implementation Aspects and Performance Analysis," *IEEE Transactions on Communications* vol. 51, No. 11, pp. 1939-1948 (Nov. 2003).
Barbarossa, S. and Scutari, G., "Distributed Space-Time Coding for Multihop Networks," *IEEE International Conference Communications* vol. 2, pp. 916-920 (Jun. 2004).

(Continued)

*Primary Examiner* — Adolf Dsouza
(74) *Attorney, Agent, or Firm* — John C. Pokotylo; Straub & Pokotylo (57) ABSTRACT

Multiple cooperative relays operate in a highly mobile environment and form a virtual antenna array. Multiple independent streams of data can be simultaneously, transmitted in parallel to the destination receiver. Thus a higher spatial multiplexing gain can be obtained. Each relay device that receives the information without errors splits it into multiple streams. For example, if the relay devices receive B symbols and the number of streams is K, each stream contains B/K symbols. Each relay device then generates a random linear combination of all the streams and transmits this output simultaneously with the other relay devices.

20 Claims, 7 Drawing Sheets

(56) References Cited

OTHER PUBLICATIONS

Laneman, N. J., Tse, D. N. C., and Wornell, G. W., "Cooperative Diversity in Wireless Networks: Efficient Protocols and Outage Behavior," *IEEE Transactions Information Theory* vol. 50, No. 12, pp. 3062-3080 (Dec. 2004).

Liu, P., Tao, Z., and Panwar, S., "A Cooperative MAC Protocol for Wireless Local Area Networks," *IEEE International Conference on Communications* pp. 2962-2968 (Jun. 2005).

Anghel, P. A., Leus, G., and Kaveh, M., "Distributed Space-Time Cooperative Systems with Regenerative Relays," *IEEE Transactions on Wireless Communications* vol. 5, No. 11, pp. 3130-3141 (Nov. 2006).

Korakis, T., Tao, Z., Slutskiy, Y., and Panwar, S., "A Cooperative MAC Protocol for Ad-Hoc Wireless Networks," *IEEE International Conference on Pervasive Computing and Communications (PerCom)* (pp. 5)(Mar. 2007).

Liu, P., et al., "Cooperative MAC for Rate Adaptive Randomized Distributed Space-Time Coding," *IEEE Global Telecommunication Conference* (6 pgs.) (2008).

\* cited by examiner

SPATIAL MULTIPLEXING GAIN FOR A DISTRIBUTED COOPERATIVE COMMUNICATIONS SYSTEM USING RANDOMIZED CODING

§0.1 RELATED APPLICATIONS

Benefit is claimed to the filing date of U.S. Provisional Patent Application Ser. No. 61/058,721 ("the '721 provisional"), titled "SPATIAL MULTIPLEXING GAIN FOR A DISTRIBUTED COOPERATIVE COMMUNICATIONS SYSTEM USING RANDOMIZED CODING," filed on Jun. 4, 2008 and listing Elza ERKIP, Thanasis KORAKIS, Pei LIU, and Shivendra S. PANWAR as inventors. The '721 provisional is incorporated herein by reference. However, the scope of the claimed invention is not limited by any requirements of any specific embodiments described in the '721 provisional.

§0.0 GOVERNMENT RIGHTS

The United States Government may have certain rights in this invention pursuant to a grant awarded by the National Science Foundation. Specifically, the United States Government may have a paid-up license in this invention and the right in limited circumstances to require the patent owner to license others on reasonable terms as provided for by the terms of Contract or Grant No. Award No. 0520054 awarded by the National Science Foundation (Division of Computer and Network Systems).

§1. BACKGROUND OF THE INVENTION

§1.1 Field of the Invention

The present invention concerns wireless communications. In particular, the present invention concerns cooperative wireless communications used to improve data throughput, reliability, and/or range.

§1.2 Background Information

Multiple antenna wireless communication systems have been shown to provide much better performance, in terms of error probability and data rate, than single antenna systems. By employing multiple antennas at transmitters and receivers, a Multiple-Input Multiple-Output ("MIMO") communications system significantly increases the data throughput, reliability and link range without additional bandwidth or transmission power. This is achieved by allowing either transmitting independent data streams on all antennas (spatial multiplexing) or transmitting coded and correlated signals on its antennas (diversity). (See, e.g., L. Zheng and D. N. C. Tse, "Diversity and Multiplexing: A Fundamental Tradeoff In Multiple-Antenna Channels," *IEEE Trans. on Info. Theory*, Vol. 49, No. 5, pp. 1073-1096 (October 2003) (incorporated herein by reference).) As the number of antennas increases, so does performance.

Bell Labs Layered Space-Time (See G. J. Foschini, "Layered Space-Time Architecture for Wireless Communication In a Fading Environment When Using Multi-Element Antennas," *AT &T Bell Lab. Tech. J.*, pp. 41-59 (October 1996) (incorporated herein by reference and referred to as "BLAST").) is a MIMO communications technique that can achieve a much higher data rate than legacy single antenna systems.

The spacing between the individual antenna elements must be large enough so that uncorrelated spatial fading can be observed at different antennas. Unfortunately, however, due to the limited size of the portable devices, there is a practical limitation on the number of antennas integrated on portable devices. This limits the possible gains for existing MIMO systems.

Cooperative wireless communication refers to active nodes in a wireless network assisting another node in information delivery, with the objective of gaining greater reliability and/or efficiency than the nodes could otherwise obtain individually. Although the wireless medium allows nodes to overhear other transmissions, traditional wireless networks ignore this overheard information (and may consider it to be unwanted interference). On the other hand, cooperative wireless communications networks exploit the broadcast nature of the wireless medium by finding effective ways of pooling the "overheard" information. The idea of tapping into the broadcast nature of wireless medium as a resource to produce more reliable links dates back to the 1970's. Practical cooperative communications concepts (sometimes referred to as "virtual MIMO"), and applications to wireless networks emerged in the last decade, stemming from the tremendous progress made in the previous decade on the design of coding and transmitting schemes for multiple input-multiple output (MIMO) systems.

Recently, several methods have been proposed for cooperation among relay devices (which may be referred to simply as "relays") to provide spatial diversity gains without utilizing multiple transmitting antennas. (See, e.g., the references: A. Sendonaris, E. Erkip, and B. Aazhang, "User Cooperation Diversity. Part 1: System Description; Part 2: Implementation Aspects and Performance Analysis," *IEEE Trans. Commun.*, Vol. 51, No. 11, pp. 1927-1948 (November 2003) (incorporated herein by reference); J. N. Laneman, D. N. C. Tse, and G. W. Wornell, "Cooperative Diversity In Wireless Networks: Efficient Protocols and Outage Behavior," *IEEE Trans. Inf. Theory*, Vol. 50, No. 12, pp. 3062-3080 (December 2004) (incorporated herein by reference); J. N. Laneman and G. W. Wornell, "Distributed Space-Time-Coded Protocols for Exploiting Cooperative Diversity in Wireless Networks," *IEEE Trans. Inf. Theory*, Vol. 49, No. 10, pp. 2415-2525 (October 2003) (incorporated herein by reference); and P. A. Anghel, G. Leus, and M. Kaveh, "Distributed Space-Time Cooperative Systems with Regenerative Relays," *IEEE Trans. Wireless Commun.*, Vol. 5, No. 11, pp. 3130-3141 (November 2006) (incorporated herein by reference).) The decode-and-forward strategy is one such method that has been shown to provide various benefits in addition to being information-theoretically optimal in certain scenarios. Common to all decode-and-forward strategies is the fact that the relays first decode the source message reliably and then relay it after re-encoding.

However, if the BLAST structure is applied directly to the distributed cooperation system, where each individual distributed antenna transmits the same waveform of an antenna as in the real MIMO BLAST system, the following challenges must be overcome with current systems.

First, currently, each relay participating in a distributed BLAST needs to be numbered, so that it knows exactly which antenna it will mimic in the underlying BLAST. Hence the exact set of participating relays needs to be determined and distributed to the nodes of the network. Such information may be distributed using separate signaling packets or piggy-backed in the data packet from the source. Unfortunately, network changes (e.g., due to a relay entering or leaving the system, or the loss or degradation of a channel between relay and a source or destination) need to be signaled, and distributing the foregoing information could become impractical.

Second, for relay selection, a detailed global knowledge of the channel conditions between each potential relay and the destination might be required for the system to be practical. To disseminate this information to the source nodes, special signaling at the MAC layer might be needed. Mobility, channel fading and the large number of nodes in a typical wireless network make it very costly, if not impossible, to distribute such information with minimal overhead within the channel coherence time (that is, the time period over which the signal strength information is valid).

Third, if information on global channel conditions is not available, relay selection and code allocation has to be based on information that is likely outdated. However due to variations in the channel, the pre-determined error rate thresholds at the chosen relays may not be met resulting in severe loss in performance.

Fourth, even though nodes other than the chosen relays may decode the source information correctly, they are not allowed to transmit (since a specific channel is transmitted to a specific, assigned, relay). This sacrifices the diversity and coding gains of BLAST.

Fifth, a distributed BLAST system would have tight constraints on the time synchronization of the nodes, putting a very heavy (if not unrealistic) burden on the MAC (layer 2—data link) and PHY (layer 1—physical) layers.

Sixth, each individual wireless link is not necessarily reliable. In a distributed BLAST system, even if only one of the relays fails to receive the data sent from the source device, one stream of the data is lost, and the destination receiver would be unable to decode the packet. Similarly, system performance is bounded by the worst link from the relays to the destination.

Thus, it would be useful to overcome, or better yet avoid, the foregoing problems and challenges associated with a distributed BLAST system, while enjoying the benefits of spatial diversity gains.

§2. SUMMARY OF THE INVENTION

Exemplary embodiments consistent with the present invention allow multiple cooperative relays to operate in a highly mobile environment and form a virtual antenna array. Multiple independent streams of data can be simultaneously transmitted in parallel to the destination receiver. Thus a higher spatial multiplexing gain can be obtained. Such exemplary embodiments might do so by allowing each relay to transmit a linear combination of antenna waveforms according to an independently and randomly generated coefficient vector. Thus, for example, rather than requiring coordination (and the signaling necessary for such coordination) among relays such that each only transmits an pre-assigned portion of the stream, each relay may independently transmit (an independently and randomly selected) part of each portion of the stream. This loosens requirements on synchronization and network topology while providing a virtual MIMO broadband physical layer.

§4. DETAILED DESCRIPTION

In a traditional MIMO system, each antenna can transmit an independent information stream to provide multiplexing gain (See, e.g., L. Zheng and D. N. C. Tse, "Diversity and Multiplexing: A Fundamental Tradeoff In Multiple-Antenna Channels," *IEEE Trans. on Info. Theory*, Vol. 49, No. 5, pp. 1073-1096 (October 2003) (incorporated herein by reference).), as done in BLAST. In BLAST, at least as many receive antennas as transmit antennas, as well as a rich scattering environment, are needed to be able to distinguish the information streams.

Embodiments consistent with the present invention apply randomization to mimic BLAST in a distributed system, and exploit the spatial multiplexing gain provided by the relay devices. This is done in a distributed way and can obtain much higher throughput than the single relay cooperative transmission scheme.

This randomized cooperation scheme may be useful in an environment in which a group of relay devices are close to the source device, and can therefore receive information at a high rate. Each relay device that receives the information without errors splits it into multiple streams. For example, if the relay devices receive B symbols and the number of streams is K, each stream contains B/K symbols. Each relay device then generates a random linear combination of all the streams and transmits this output simultaneously with the other relay devices.

Compared with a single stream transmission or a transmission using space-time coding, the transmission time of the second hop is reduced by a factor of K, thereby increasing the throughput.

For the parallel transmissions to be successfully decoded at the destination device, the destination device might be provided with multiple antennas. One possible useful scenario is uplink communication, where the base stations, which would be the destination node, typically are equipped with multiple antennas.

Embodiments consistent with the present invention enjoy all the benefits BLAST in terms of flexibility, and enable high rate transmission in the second hop with minimal signaling overhead at the MAC layer.

Figure 1:
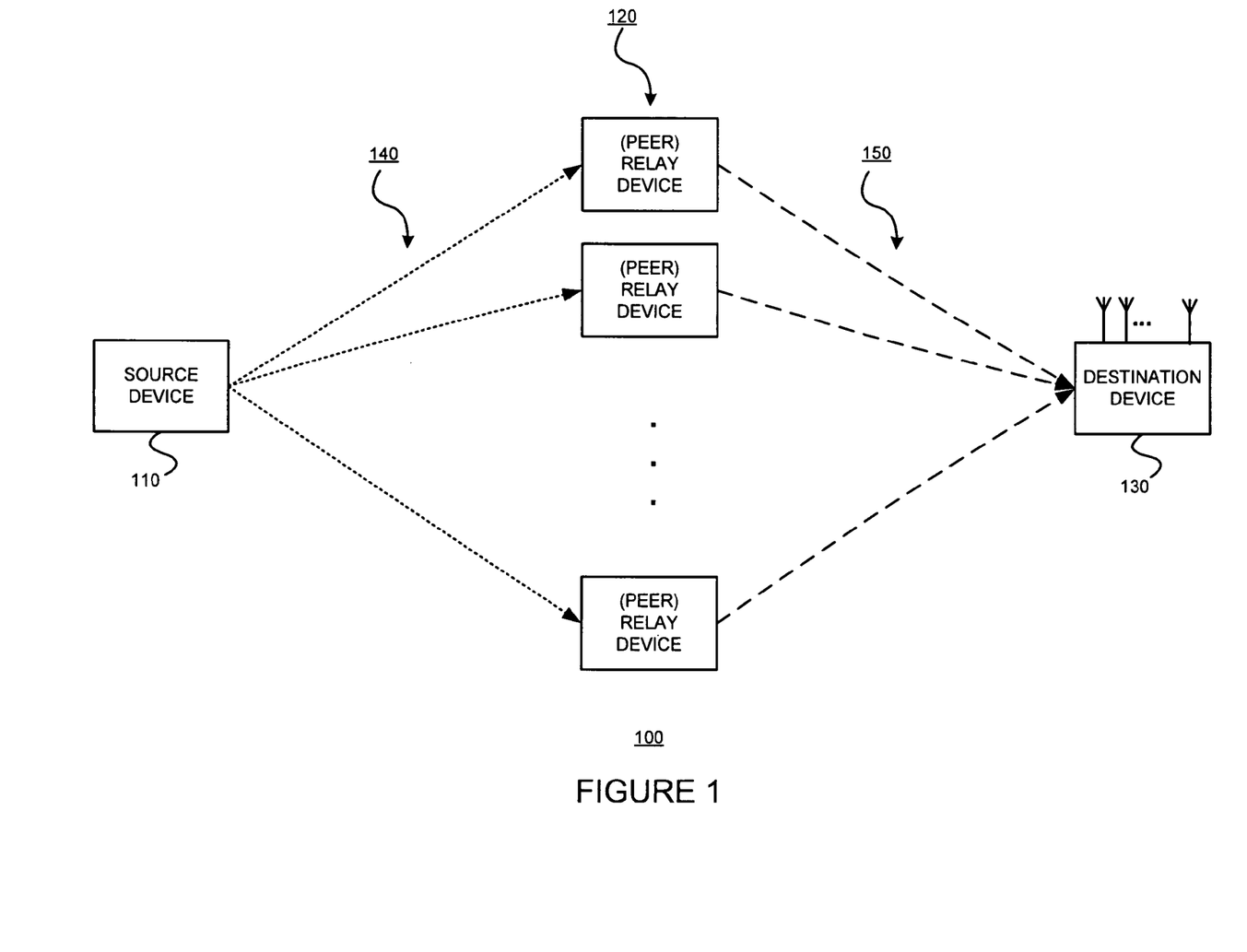
FIG. 1 illustrates an exemplary environment in which embodiments consistent with the present invention may operate.

§4.1 Exemplary Environment in which Embodiments Consistent with the Present Invention May Operate FIG. 1 illustrates an exemplary environment 100 in which embodiments consistent with the present invention may operate. As shown, the environment 100 includes a source device 110, a plurality of relay devices 120 and a destination device 130. The source device 110 include may include one antenna, or a plurality of (T) antennas. Assume that the destination device 130 includes a plurality of (L) antennas. There are a total of N source, relay and destination devices in the network. Embodiments consistent with the present invention are useful when T<L—that is, when the destination device 130 has more antennas than the source device 110 has.

As shown by lines 140, to maximize spatial multiplexing gain, the source device 110 first broadcasts a data packet (or an "information stream", which is to be interpreted broadly to include a single packet, or a sequence of packets) for receipt by each relay 120. (Note that if the Source Device has More than One Antenna (that is, a Plurality of (T) antennas), then multiple streams may be transmitted, and/or multiple instances of the same stream may be transmitted. However, to simplify the description, embodiments consistent with the present invention will be described with reference to a single information stream.) Then, as shown by lines 150, each of the relay devices 120 transmits, cooperatively (in synchronization and in parallel with the other relay devices), to the destination device 130, thereby achieving a high spatial multiplexing gain.

§4.2 Exemplary Relay Peer Architecture

Figure 2:
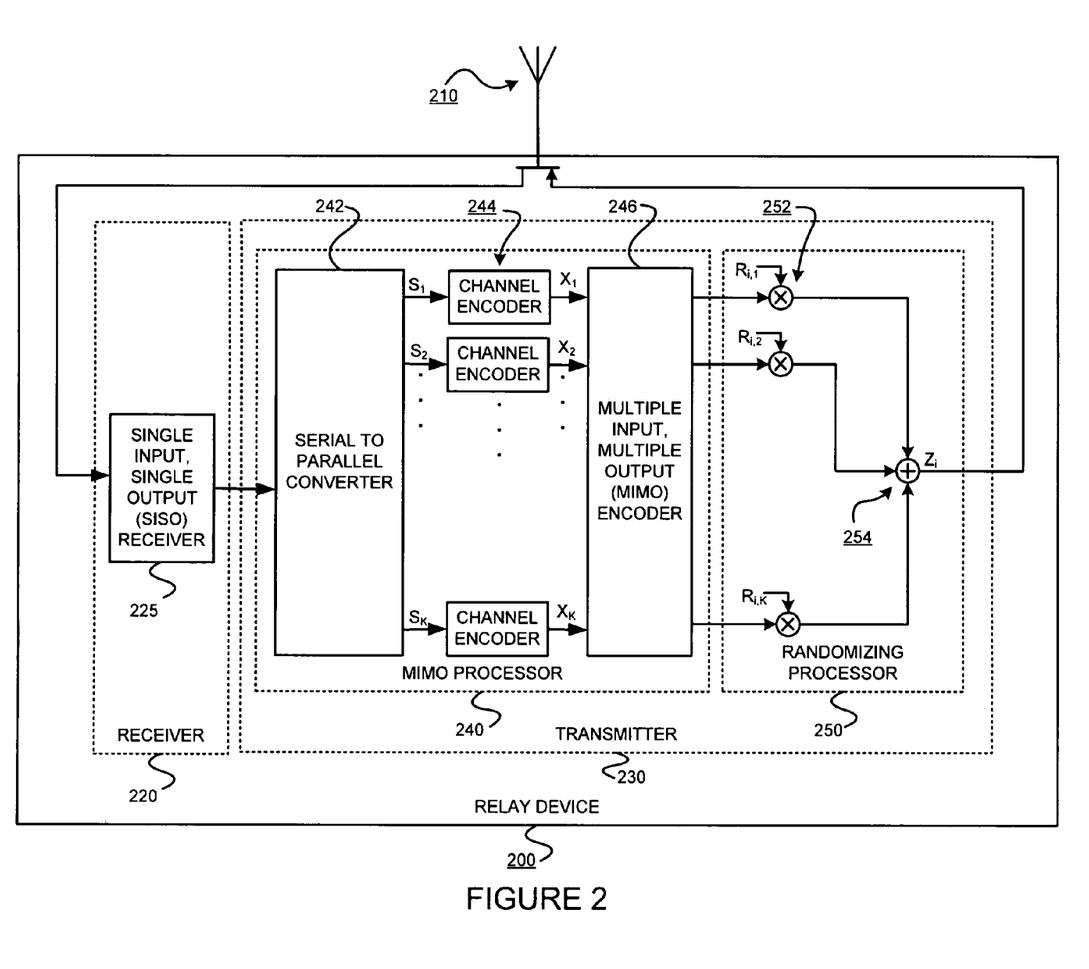
FIG. 2 is a block diagram of an exemplary relay architecture consistent with the present invention.

FIG. 2 is a block diagram illustrating an architecture of an exemplary relay device 200 consistent with the present invention. The exemplary relay device 200 may include a transmit/receive antenna 210, a receiver portion 220 and a transmitter portion 230.

The receiver portion 220 includes a single-input-single-output ("SISO") receiver 225 which accepts a signal received by antenna 210 (from source device), and which outputs a serial signal to the transmitter 230.

The transmitter portion 230 includes a MIMO processor 240 followed by a randomizing processor 250. The MIMO processor 240 may be a known MIMO processor and may use known MIMO processing techniques, which are understood by those skilled in the art. On the other hand, the use of the randomizing processor 250 in the context illustrated is new and advantageous.

The MIMO processor includes a serial-to-parallel converter 242, a plurality of (K) channel encoders 244 and a MIMO encoder 246. Basically, the serial to parallel converter 242 converts the serial output signal of the SISO receiver into K signals ($S_1$ through $S_K$). Each of the signals $S_1$ through $S_K$ is encoded by one of the K channel encoders 244 to generate K encoded signals ($X_1$ through $X_K$). The MIMO encoder 246 accepts the K encoded signals $X_1$ through $X_K$ and outputs K signals.

The relay device 200 may include a device for generating a random vector of length K, where each component of the random vector of the $i^{th}$ relay device 200 is denoted as $R_{i,1}$ through $R_{i,K}$ as shown. Each of the K outputs of the MIMO encoder 246 is mixed with each component of the random vector with mixers 252. The K outputs of the K mixers 252 are then combined by combiner 254 to obtain an output signal ($Z_i$). If the number of bits in the received information stream is B, then the number of bits in the output signal $Z_i$ will be B/K. The output signal $Z_i$ is then transmitted for reception by the destination device. Each of the plurality of relay devices will therefore transmit, simultaneously (or effective simultaneously), a random linear combination of all the K streams.

At least some embodiments consistent with the present invention may be implemented in hardware (e.g., integrated circuits, application specific integrated circuits, programmable logic or gate arrays, etc.), and/or software (e.g., program instructions stored in memory such as a RAM, ROM, etc., and/or stored on a storage device such as a magnetic or optical disk, etc., executed on a general purpose processor such as a microprocessor).

§4.3 Exemplary Methods

Figure 3:
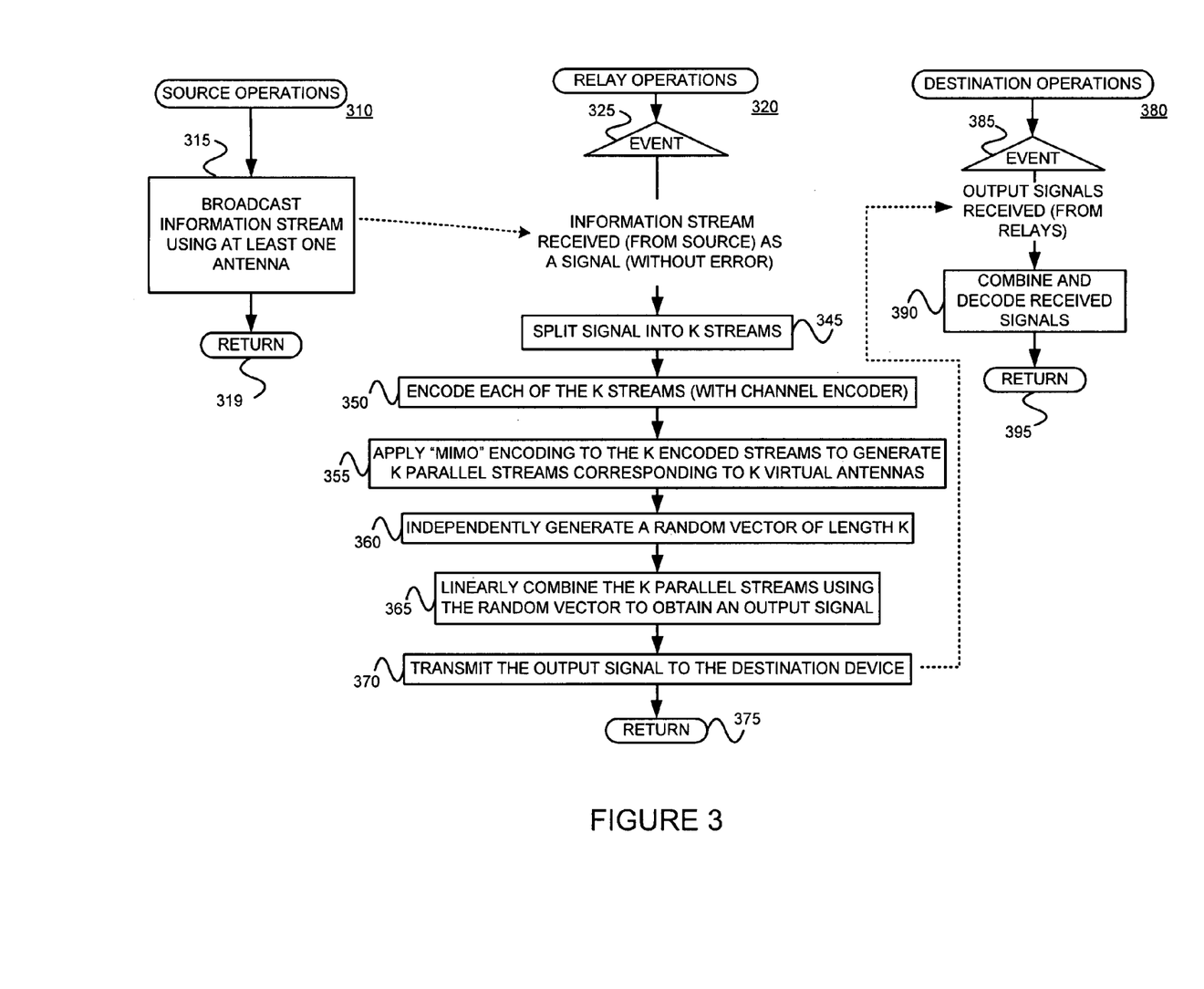
FIG. 3 includes flow diagrams of exemplary operating methods, consistent with the present invention, of a source device, each of a plurality of relay devices, and a destination device.

FIG. 3 includes flow diagrams of exemplary operating methods 310, 320, and 380, consistent with the present invention, of a source device, each of a plurality of relay devices, and a destination device, respectively. Each packet (or more generally, information stream) transmission from source device to destination device occurs in two steps. Referring to the left side of FIG. 3, in the first step, the source device broadcasts its packet (or information stream) for receipt by all its (peer) relay devices. (Block 315)

Referring back to blocks 315 and 325, in at least some embodiments consistent with the present invention, the source device may append a frame checksum ("FCS") to the sourced packet. In such a case, each relay device first tries to decode the packet and verify the FCS to see if they received the packet correctly. Each relay will participate in the cooperative transmission only if it receives correct information.

Referring now to the middle of FIG. 3, in the second step, M cooperative relay devices (acting as virtual antennas) transmit together cooperatively (in parallel and in synchronization). Each of the relay devices might include a transceiver architecture such as described above with reference to FIG. 2. Referring to FIG. 3, upon receipt of the information stream (event 325) each relay device splits the packet into K streams (Block 345) according to a deterministic manner. (Recall, e.g., serial-to-parallel converter 242 of FIG. 2.). The number K is the multiplexing gain for the cooperative transmissions. The value of K should be less than M (the number of cooperative relay devices) and L (the number of antennas at the destination device), though K, in principle, could be set to L. The value K defines the degree of freedom of the transmission.

Each of the K streams is then encoded (e.g., with a channel encoder) (Block 350) and passed through a MIMO encoder Q, which is a standard MIMO signal processing procedure (Block 355). (Recall 244 and 246 of FIG. 2.) The value Q does not necessarily depend on the channel information.

The output from the MIMO encoder is in the form of K parallel streams. Each of these K streams corresponds to an antenna in the BLAST transmissions with K transmit antennas.

Instead of letting each relay device pick a unique data stream from the output of the coordinate system (as is the case with known systems), the $i^{th}$ relay device independently generates a random vector $r_i$ of length K (Block 360) and generates a linear combination of the K data streams using the random vector to form an output signal (Block 365). (Recall, e.g., 250 of FIG. 2.) The method 320 then transmits the output signal to the destination device.

Referring back to 325 of FIG. 3, the relay device might first decode the packet (or information stream) from the source device and only continue if a correct packet (or information stream) is received.

Referring back to block 355 of FIG. 3, the MIMO encoder could be the same encoder as used in D-BLAST, R-BLAST (See G. J. Foschini, "Layered Space-Time Architecture for Wireless Communication In a Fading Environment When Using Multi-Element Antennas," *AT &T Bell Lab. Tech. J.*, pp. 41-59 (October 1996) (incorporated herein by reference).), or beam-forming systems. Such MIMO encoders are known to those skilled in the art.

Referring back to block 360 of FIG. 3, one possible way to generate $r_{ij}$ in a manner consistent with the present invention is using a complex Gaussian variable generator with zero mean and variance of 1/K. Another option is to let the variance of $r_{ij}$ be less than 1/K. By doing so, each relay device does not necessarily operate at full power. For example, if the variance is $1/K^2$, each relay device only utilizes 1/K of its transmission power. Doing this provides another degree of freedom for the relay devices (by allowing them to adjust their transmission power while relaying). In at least some embodiments consistent with the present invention, for each packet transmitted, a new $r_{ij}$ is generated, where i is the index of the relays and j is the index of the K virtual antennas. Each element of $r_i$ is denoted by $r_{ij}$ which is an independently generated random variable.

Referring back to block 370, the signal transmitted from relay device i can be expressed by:

$$z_i = \sqrt{E_s} r_i Q X$$

where $r_i = [r_{i1} \, r_{i2} \ldots r_{iK}]$ and $X = [x_1 \, x_2 \ldots x_K]^t$ are the coded bits. The received signal at the destination can be expressed by:

$$Y = HZ + W = \sqrt{E_s} HRQX + W$$

Here H is the channel matrix, $Z' = [z_1 \, z_2 \ldots z_M]$, $R' = [r_1 \, r_2 \ldots r_M]$ and W is the noise.

Referring to the right side of FIG. 3, a destination device, upon receiving output signals from the relay devices (event 385), may combine and decode the received signals 390.

Assuming coherent detection is employed at the destination device receiver, the capacity upper bound for the system is:

$$I < \log_2 det(I|_{N_0}{}^{E_s} HRJ_x R^H H^H) \text{bits/s/Hz}$$

where $(\;)^H$ is the Hermitian matrix. $J_x$ is the covariance matrix of the signal after the coordinate system and is only a function of the multiplexing coordinate system:

$$J_x = QQ^H.$$

In a practical distributed wireless network, it is difficult to feedback the random coefficient $r_i$ and the channel information to the transmitter in real time. One way to simplify the design is to let Q=I, the identical matrix.

BLAST requires that the receivers know the channel information to achieve the maximum capacity. However, in a real system, perfect channel information is not attainable. The channel is often estimated using pilot symbols. An interesting point is that, for systems consistent with the present invention, there is no need to estimate H and R separately; only the effective channel matrix G:=HR is required. Thus, at least some embodiments consistent with the present invention might put the same pilot symbols as used in MIMO channel estimation in front of the data packet. Using the same channel estimation method used in regular MIMO systems, effective channel matrix G can be derived at the destination device receiver. The signal at the receiver can also be described by:

$$Y = \sqrt{E_s} GX + W.$$

Here, assume Q=I. This decoder architecture could be a maximum-likelihood ("ML") based decoder. Since the received signal mimics a MIMO system with channel matrix G, the standard minimum mean square error-successive interference cancellation ("MMSE-SIC") also achieves maximum capacity. This greatly reduces the complexity of the decoder.

§4.3.1 Exemplary Synchronization of Relay Transmissions

Referring back to block 370 of FIG. 3, the transmissions from all participating relay devices have to be synchronized both in time and frequency. The time accuracy of the relay devices is less than the destination device receiver's symbol duration time, and within its capability to handle the delay spread of the system. In a narrow-band system, the symbol duration is at least a few microseconds. In a wide-band system, the current dominant physical layer solution is orthogonal frequency division multiplexing ("OFDM"), whose symbol duration is also above a few microseconds (10 microseconds for IEEE 802.11g and 100 microseconds for IEEE 802.16m).

One of the possible ways to synchronize relay device transmissions in a manner consistent with the present invention is to have the relay devices transmit a fixed time interval after the packet is received from the source device. As long as the clock speed is larger than 10 MHz, it is not difficult to guarantee accuracy to the order of 0.1 microsecond in hardware. Another approach is to have all devices synchronized to a reference clock (e.g., using a Global Positioning System ("GPS") chip), and have the source device set the time that all relay devices should transmit.

In OFDM systems, frequency synchronization is also required. The goal is to keep the drift of the central carrier frequency under a certain threshold. This can be done in a manner consistent with the present invention by allowing a device (node), such as the access point, the base station, the source device, or one of the relay devices, to send a reference carrier signal to which all the relays are locked.

§4.3.2 Exemplary MAC Layer Protocols

Figure 4:
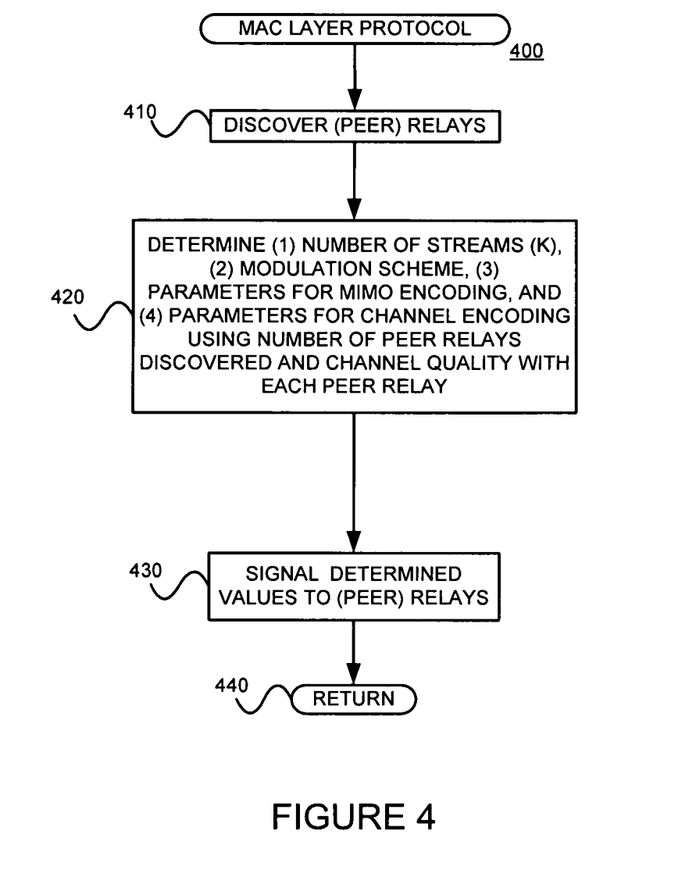
FIG. 4 is a flow diagram of an exemplary MAC layer protocol consistent with the present invention.

FIG. 4 is a flow diagram of an exemplary, MAC layer protocol 400 consistent with the present invention. This protocol 400 may be performed by the source device or a proxy. Relay devices are discovered. (Block 410) The channel quality between the source and each peer might also be determined. Then, the number of streams K, the modulation schemes of the transmissions (for either or both hops), parameters for the MIMO encoding and/or parameters for channel encoding may be determined using the number of relay devices discovered (and perhaps the channel qualities determined). (Block 420). These determined values may then be signaled to the relay devices (for use by those devices). (Block 430)

The randomized cooperative PHY layer schemes should be supported by the appropriate MAC layer protocol in order to enjoy the above benefits in a realistic network. One of the main goals of the MAC is to enable the source to discover the relays. Exemplary solutions consistent with the present invention can be found in the articles: P. Liu, Z. Tao, and S. Panwar. "A Cooperative MAC Protocol for Wireless Local Area Networks," In Proc., *IEEE Intl. Conf. on Commun.*, (Seoul, Korea, June 2005) (incorporated herein by reference); T. Korakis, Z. Tao, Y. Slutskiy, and S. Panwar, "A Cooperative MAC Protocol for Ad-Hoc Wireless Networks", *In Proceedings of PWN07* (White Plains, N.Y., March 2007) (incorporated herein by reference); S. Panwar, P. Liu and Z. Tao, "Cooperative Wireless Communications", U.S. Pat. No. 7,330,457 (incorporated herein by reference); and S. Barbarossa and G. Scutari, "Distributed Space-Time Coding for Multihop Networks," *in Proc. IEEE Int. Conf. Commun.*, Vol. 2, pp. 916-920 (Jun. 20-24, 2004) (incorporated herein by reference), where various schemes to enable passive and active neighbor discovery process are described, together with the necessary signaling protocol to support the distribution of the neighbor information.

Referring back to block 420 of FIG. 4, the MAC may function to choose (or otherwise determine) the number of streams, the modulation scheme, as well as the parameters for the MIMO encoder and channel encoder used by all the relays. In at least some exemplary embodiments consistent with the claimed invention, the MAC may attempt to choose the number of parallel streams K, as close as possible to the number of relay devices M to maximize spatial multiplexing gains. However, the MAC should guarantee that there are at least K relay devices in the network for most of the time.

In a multi-rate environment, the MAC should also select the transmission rates for both hops (source to relay devices, and relay devices to destination) since the effective throughput depends on those rates to a significant degree. Generally speaking, using a higher data rate for the first hop transmission consumes less time, though at the cost of potentially fewer relay devices that can participate. Fewer relay devices means the spatial multiplexing capability is reduced and the supported data rate for the second hop will be lower. As the foregoing demonstrates, there is a trade-off between the data rates of the first hop and the second hop to maximize the throughput.

The MAC can also optimize other performance metrics such as coverage and interference.

Rate adaptation is essential if it is desired to maximize the network layer performance metric by picking the coding, modulation and multiplexing schemes for each transmission. For example, to maximize the MAC layer throughput, some embodiments consistent with the present invention could minimize the transmission time of a packet of B bits:

$$T_c = \frac{B}{R_1} + \frac{B}{R_2},$$

where $R_1$ and $R_2$ are the data rate for the first hop and the second hop, respectively. In this example, the MAC layer overheads and the bandwidth used to resolve contention are ignored. In at least some embodiments consistent with the present invention, cooperative transmissions are employed only when cooperative transmissions take less time than direct transmissions.

The performance of the cooperative randomized spatial multiplexing not only depends on the number of the relay devices, but also depends on the channel condition of each individual relay to the source and the destination. When channel information is available, in at least some embodiments consistent with the present invention, rate adaptation can be based on the channel information to maximize the network performance. If such information is not available at the transmitter, it could be also based on the number of relays, and/or density of the network. By assuming that the devices (nodes) are placed in the network randomly, the rate adaptation can be based on the average performance. The rate adaptation could also be a destination device (receiver) feedback based, in which receiver measures the received signal quality. The destination device (receiver) then might either send a command, or the quality of the signal to the source device. The source device may then adjust the rate according to this command or measurement.

The rate adaptation could also be a hybrid method of the above mentioned methods. In a dense network, node density or neighbor count is enough to achieve the full potential of the rate adaptation, thus detailed channel information is not required anymore.

§4.4 Capacity

§4.4.1 Capacity in Fast Fading Channel

This cooperative transmission system is effectively a communication system with K virtual antennas and channel matrix G. In a fast fading MIMO channel, the capacity for a scheme consistent with the present invention is:

$$C = E_G\left[\log_2 \det\left(I + \frac{E_s}{N_0} GG^H\right)\right] \text{ bits/s/Hz.}$$

Equal power allocation between the transmitting antennas is assumed.

This capacity is achieved by coding over multiple coherence time intervals of the channel. The capacity for such a system not only depends on the number of the antennas, but also depends on the distribution of the equivalent channel matrix G. If the environment is richly scattered, the channel can be modeled as the i.i.d Rayleigh fading. $h_{ij}$ is an i.i.d complex Gaussian variable with zero mean and unit variance. Recall that $r_{ij}$ is also an i.i.d complex Gaussian variable with zero mean and variance $1/K$. By Jensen's inequality, an upper-bound for the capacity can be derived and expressed as:

$$C < K\log_2\left(1 + \frac{NLE_s}{KN_0}\right) \text{ bits/s/Hz.}$$

Compared to the MIMO system with (K, L) antennas, whose capacity is upper bounded by:

$$C < K\log_2\left(1 + \frac{LE_s}{KN_0}\right),$$

a distributed randomized cooperative scheme consistent with the present invention has a gain of K log N in high SNR region. This extra gain is because of the extra power emitted by all the relay devices (while in the MIMO system, the sum of the power on all antennas is bounded). This capacity is K+log N/K time the capacity of a SISO system in high SNR region.

The capacity upper bound has been derived. However, the capacity bound can only be achieved if the eigenvalues for G is well-conditioned. In another word, the ratio between the largest eigenvalue to the smallest eigenvalue of $GG^H$ should be close to 1 in order to achieve the capacity upper bound. A numerical example was used to analyze the real capacity in a Gaussian fading channel. The results are shown in FIGS. 5 and 6, which illustrate simulations of capacity of exemplary systems consistent with the present invention (as compared with conventional SISO and MIMO systems) in a Gaussian fading channel and a fast Rayleigh fading channel.

Figure 5:
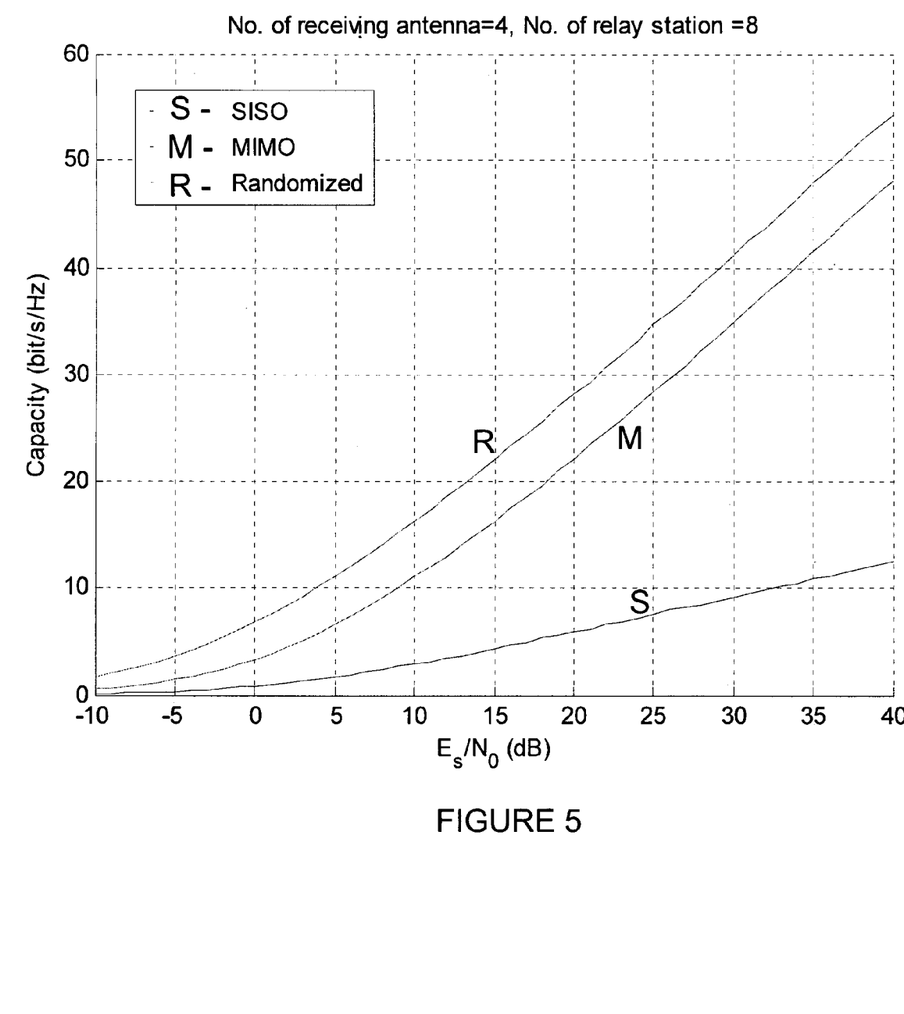
FIGS. 5 and 6 illustrate simulations of capacity of exemplary systems consistent with the present invention (as compared with conventional single-input-single-output and MIMO systems) in a Gaussian fading channel and a fast Rayleigh fading channel.
Figure 6:
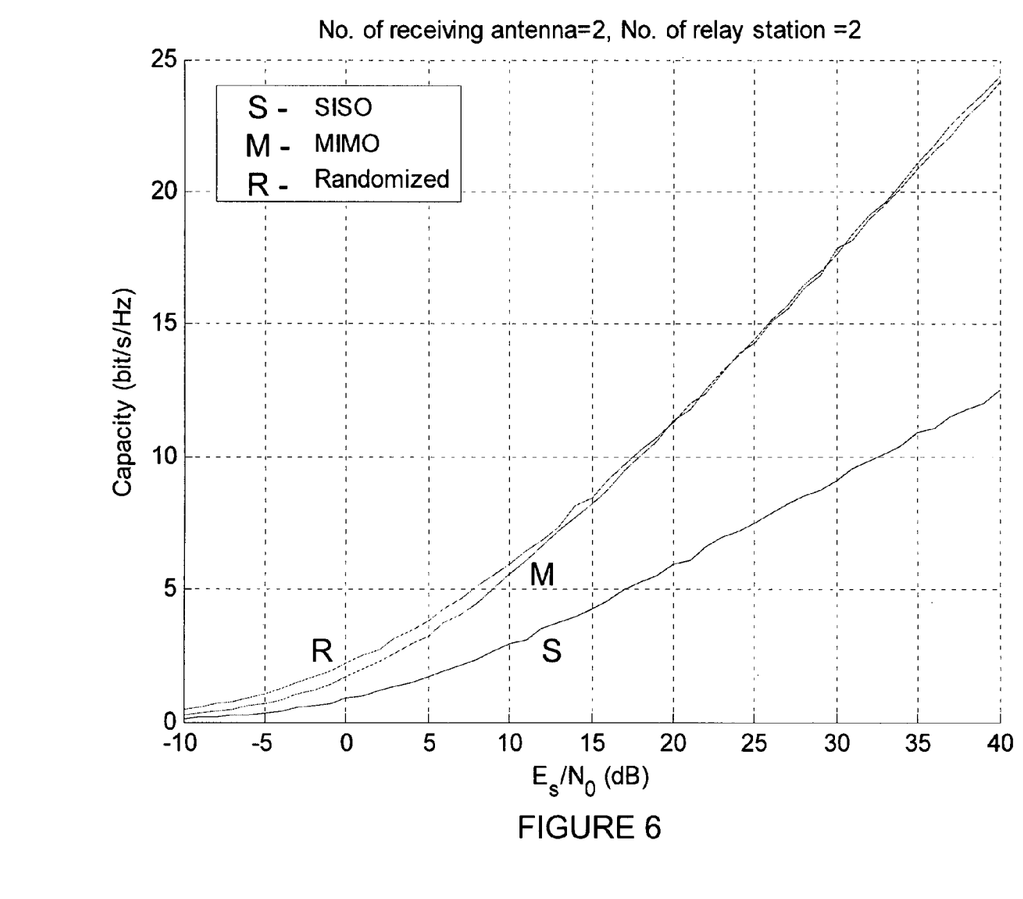

FIGS. 5 and 6 illustrate that: (1) when the physical environment is richly scattered, the rate for the second hop scales with K log(Es/N0) for a randomized distributed cooperative scheme when fast fading is present; and (2) when the number of transmitters is larger than the number of receiving antennas, there is extra power gain.

§4.4.2 Capacity in Slow Fading Channel

In a slow fading Rayleigh channel, H is assumed to be fixed over the transmission time but random. Assume the transmitter only knows the statistical characterization of the channel, but not the channel realization (which is only available at the destination device (receiver)). The transmitter communicates at a target rate R bits/s/Hz and codes the information bits at that rate without the information about the instant H. The information theory guarantees that, as long as the capacity for any channel realization is larger than this targeted rate R, the receiver can successfully recover the information bits. When the instant capacity is less than R, an outage happens.

The outage probability for the randomized distributed cooperative system with coordinate system Q=I, which is optimum for high SNR region, can be expressed by:

$$P_{out}(R) = P\left\{\log_2 \det\left(I + \frac{E_s}{N_0} HRR^H H^H\right)\right\},$$

Figure 7:
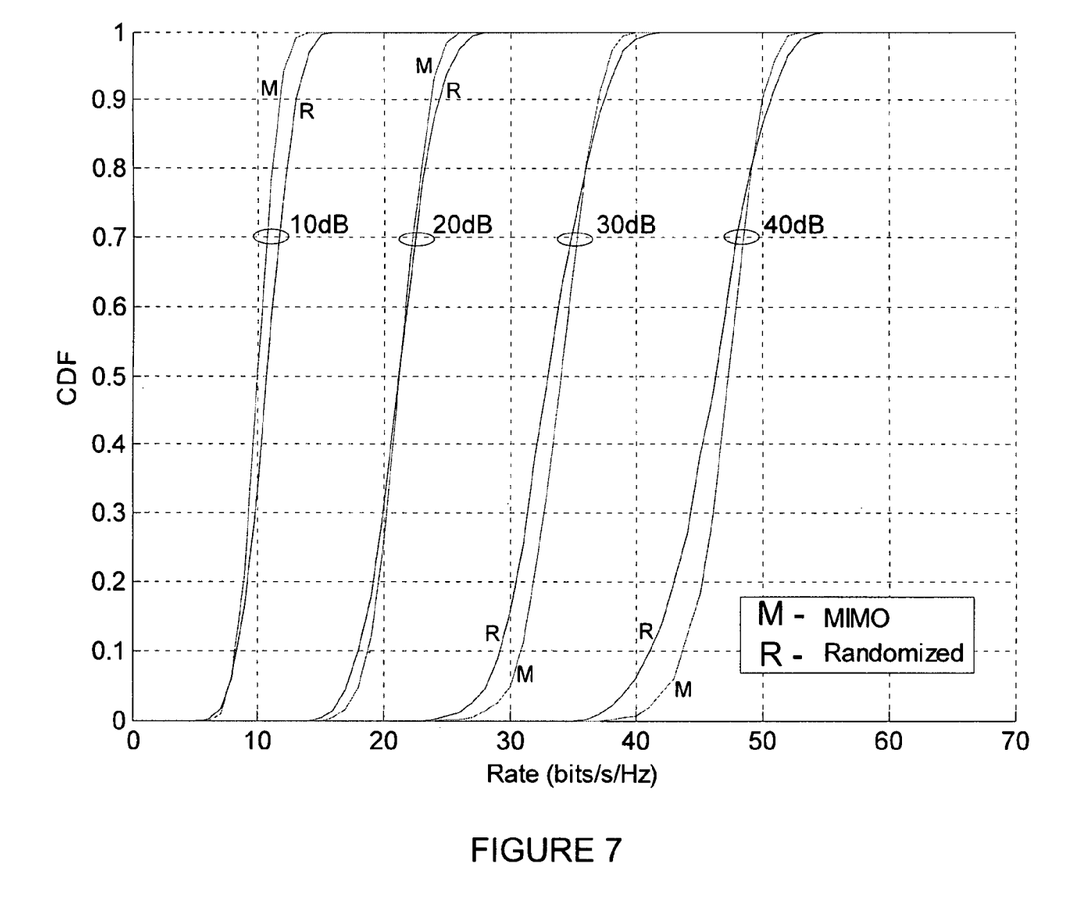
FIG. 7 illustrates a CDF function for rate distribution of exemplary systems consistent with the present invention (as compared with a conventional MIMO system) in a Rayleigh slow fading channel.

FIG. 7 illustrates a cumulative distribution function ("CDF") for rate distribution of exemplary systems consistent with the present invention (as compared with a conventional MIMO system) in a Rayleigh slow fading channel. A numerical analysis is shown. Under various receiving SNR values, a distributed randomize cooperation scheme consistent with the claimed invention mimics the outage probability of a real MIMO. For example, if the targeted outage probability is 90% and SNR is 40 dB, the capacity is within 1% of the MIMO system. Thus randomized spatial multiplexing scheme can indeed achieve the capacity gain as its MIMO counterpart.

§4.5 Conclusions

In a traditional MIMO system, each antenna can transmit an independent information stream to provide multiplexing gain (See, e.g., L. Zheng and D. N.C. Tse, "Diversity and Multiplexing: A Fundamental Tradeoff In Multiple-Antenna Channels," *IEEE Trans. on Info. Theory*, Vol. 49, No. 5, pp. 1073-1096 (October 2003) (incorporated herein by reference).) as done in BLAST. In BLAST, at least as many receive antennas as transmit antennas, as well as a rich scattering environment, are needed to be able to distinguish the information streams.

Embodiments consistent with the present invention apply randomization to mimic BLAST in a distributed system, and exploit the spatial multiplexing gain provided by the relay devices. This is done in a distributed way and can obtain much higher throughput than the single relay cooperative transmission scheme.

This randomized cooperation scheme may be useful in an environment in which a group of relay devices are close to the source device, and can therefore receive information at a high rate. Each relay device that receives the information without errors splits it into multiple streams. For example, if the relay devices receive B symbols and the number of streams is K, each stream contains B/K symbols. Each relay device then generates a random linear combination of all the streams and transmits this output simultaneously with the other relay devices.

Compared with a single stream transmission or a transmission using space-time coding, the transmission time of the second hop is reduced by a factor of K, thereby increasing the throughput.

For the parallel transmissions to be successfully decoded at the destination device, the destination device might be provided with multiple antennas. One possible useful scenario is uplink communication, where the base stations, which would be the destination node, typically are equipped with multiple antennas.

Embodiments consistent with the present invention enjoy all the benefits of BLAST in terms of flexibility, and enable high rate transmission in the second hop with minimal signaling overhead at the MAC layer.

Upon receiving a correct packet from the source, each relay device individually splits the data into multiple streams, generates a random coefficient used to randomize each stream, and sends a combined signal of all the randomized streams. Using randomized coding, it is not required to track the exact number of devices (nodes), and track whether all relays received the packet correctly.

There is no need to estimate the channel matrix H and the randomized coefficient R. Instead, by sending a pilot/measurement signal on each of the streams, the destination may estimate the effective channel G=HR and use this G in the ML or MMSE-SIC decoder to estimate the information bits. Regular ML or MMSE-SIC receiving structure is also an optimum receiver for the randomized spatial multiplexing.

Several alternative methods for rate adaptation may be used to maximize the network layer performance metric. Rate adaptation could be based on (a) the channel information, (b) the number of relay devices, (c) density of the network, and/or (d) destination device (receiver) feedback. The rate adaptation may be per packet transmission based.

The source device or a central controller (base station and access point) may be used to choose or otherwise determine the coding and modulation scheme for both hops. Using an explicit signaling packet or piggybacking in a data packet, the source device and all relay devices can use this pre-assigned scheme.

The number of streams K should be less than or equal to the number of receiving antennas L. For each transmission, the probability that there is less than K relays should be small.

In legacy wireless networks, the transmission rate to a device far away must often be low. Methods consistent with the claimed invention may be used to increase the effective data rate for those receiving devices. The smaller the gap is in effective rate among devices, the more uniform coverage is achieved. Indeed, methods consistent with the present invention might be used to reach a device far away that could not be reached using a direct transmission.

Embodiments consistent with the present invention may work in an infrastructure based network, as well as a mobile ad hoc network.

If the random coding changes from packet to packet, system performance will not be bounded by the worst link in the network. The random coding can change within a packet to get better performance. However, the destination device receiver may need to be trained to detect coherently.

Embodiments consistent with the present invention are not necessarily limited to cooperative transmissions. As long as several devices have the same information, they can perform such randomized multiplexing.

The transmission power for each relay device might be adjusted according to the network conditions. It also depends on the power budget.

What is claimed is:

1. A method for transmitting data from a source wireless device to a destination wireless device, the method comprising:
   a) receiving, with each of a plurality of relay wireless devices, a transmission of the data from the source wireless device;
   b) splitting, with each of the plurality of relay wireless devices, the received transmission into K streams;
   c) encoding, with each of the plurality of relay wireless devices, each of the K streams;
   d) applying, with each of the plurality of relay wireless devices, multiple-input-multiple-output (MIMO) encoding to the K encoded streams to generate K parallel streams;
   e) independently generating, with each of the plurality of relay wireless devices, a random vector of length K;
   f) linearly combining, with each of the plurality of relay wireless devices, the K parallel streams using the random vector to obtain an output signal; and
   g) transmitting, with each of the plurality of relay wireless devices, the output signal to the destination device.

2. The method of claim 1 wherein the act of transmitting, with each of the plurality of relay wireless devices, the output signal to the destination device is done in synchronization with, and in parallel with, the transmissions by each of the other of the plurality of relay wireless devices.

3. The method of claim 1 wherein the act of encoding, with each of the plurality of relay wireless devices, each of the K streams, is performed with a channel encoder.

4. The method of claim 1 wherein the plurality of relay wireless devices consists of M relay wireless devices, and wherein the value of K is less than the value of M.

5. The method of claim 1 wherein the act of independently generating, with each of the plurality of relay wireless devices, a random vector of length K, uses a complex Gaussian variable generator.

6. The method of claim 5 wherein the complex Gaussian variable generator has a zero mean.

7. The method of claim 5 wherein the complex Gaussian variable generator has a variance of 1/K or less.

8. The method of claim 1 wherein the act of transmitting, with each of the plurality of relay wireless devices, the output signal to the destination device is performed a fixed time interval after the act of receiving, with the each of the plurality of relay wireless devices, the transmission of data from the source wireless device.

9. The method of claim 1 wherein each of the plurality of relay wireless devices is locked to a reference carrier signal.

10. A method comprising:
   a) receiving, with one of a plurality of relay wireless devices, a transmission of data from a source wireless device;
   b) splitting, with the one relay wireless device, the received transmission into K streams;
   c) encoding, with the one relay wireless device, each of the K streams;
   d) applying, with the one relay wireless device, multiple-input-multiple-output (MIMO) encoding to the K encoded streams to generate K parallel streams;
   e) independently generating, with the one relay wireless device, a random vector of length K;
   f) linearly combining, with the one relay wireless device, the K parallel streams using the random vector to obtain an output signal; and
   g) transmitting, with the one relay wireless device, the output signal to a destination device.

11. The method of claim 10 wherein the act of transmitting, with the one relay wireless device, the output signal to the destination device is done in synchronization with, and in parallel with, the transmissions by other of the plurality of relay wireless devices.

12. The method of claim 10 wherein the act of encoding, with the one relay wireless device, each of the K streams, is performed with a channel encoder.

13. The method of claim 10 wherein the plurality of relay wireless devices consists of M relay wireless devices, and wherein the value of K is less than the value of M.

14. The method of claim 10 wherein the act of independently generating, with the one relay wireless device, a random vector of length K, uses a complex Gaussian variable generator.

15. The method of claim 14 wherein the complex Gaussian variable generator has a zero mean.

16. The method of claim 14 wherein the complex Gaussian variable generator has a variance of 1/K.

17. The method of claim 10 wherein the complex Gaussian variable generator has a variance of less than 1/K.

18. The method of claim 10 wherein the act of transmitting, with the one relay wireless device, the output signal to the destination device is performed a fixed time interval after the act of receiving, with the one of relay wireless devices, the transmission of data from the source wireless device.

19. The method of claim 10 wherein each of the plurality of relay wireless devices is locked to a reference carrier signal.

20. A wireless apparatus comprising:
   a) a receiver configured to receive a transmission of data from a source wireless device;
   b) a converter configured to split the received transmission into K streams;
   c) channel encoders configured to encode each of the K streams;
   d) a multiple-input-multiple-output (MIMO) encoder configured to apply multiple-input-multiple-output (MIMO) encoding to the K encoded streams to generate K parallel streams;
   e) a randomizing processor configured to independently generate a random vector of length K;
   f) a combiner configured to linearly combine the K parallel streams using the random vector to obtain an output signal; and
   g) a transmitter configured to transmit the output signal to a destination device.

* * * * *